United States Patent
Jang et al.

(10) Patent No.: US 12,353,657 B2
(45) Date of Patent: Jul. 8, 2025

(54) REFRIGERATOR INCLUDING TOUCH INTERFACE

(71) Applicant: Samsung Electronics Co., Ltd., Suwon-si (KR)

(72) Inventors: Boeun Jang, Suwon-si (KR); Sangho Park, Suwon-si (KR); Buyeong Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/413,802

(22) Filed: Jan. 16, 2024

(65) Prior Publication Data

US 2024/0264688 A1 Aug. 8, 2024

Related U.S. Application Data

(63) Continuation of application No. PCT/KR2024/000423, filed on Jan. 9, 2024.

(30) Foreign Application Priority Data

Feb. 2, 2023 (KR) .................. 10-2023-0014416
Apr. 17, 2023 (KR) .................. 10-2023-0050047

(51) Int. Cl.
*G06F 3/041* (2006.01)
*F25D 11/00* (2006.01)
(Continued)

(52) U.S. Cl.
CPC ............ *G06F 3/0412* (2013.01); *F25D 11/00* (2013.01); *F25D 23/028* (2013.01); *F25D 27/00* (2013.01)

(58) Field of Classification Search
CPC .... F25D 23/028; F25D 23/02; F25D 2700/04; F25D 29/005; F25D 29/00;
(Continued)

(56) References Cited

U.S. PATENT DOCUMENTS 10,194,756 B2 2/2019 Gierens et al.
10,339,742 B2 7/2019 Kim et al.
(Continued)

FOREIGN PATENT DOCUMENTS

CN 217269409 U 8/2022
EP 1 108 106 B1 2/2006
(Continued)

OTHER PUBLICATIONS

International Search Report dated Apr. 9, 2024 for International Application No. PCT/KR2024/000423.
(Continued)

*Primary Examiner* — Koosha Sharifi-Tafreshi
(74) *Attorney, Agent, or Firm* — STAAS & HALSEY LLP

(57) ABSTRACT

A refrigerator including a main body configured with a storage compartment; a door configured to be rotatable to open and close the storage compartment; a touch interface on the door, and configured to sense a touch of a user, and a door opening device configured to rotate the door to open the storage compartment when the touch interface senses the touch of the user, wherein the touch interface includes an indicator configured to emit light out of the touch interface to assist a user to locate the touch interface.

14 Claims, 16 Drawing Sheets

(51) Int. Cl.
*F25D 23/02* (2006.01)
*F25D 27/00* (2006.01)

(58) Field of Classification Search
CPC ............ F25D 2400/361; F25D 2700/02; E05F 15/75; E05Y 2900/31
See application file for complete search history.

(56) References Cited

U.S. PATENT DOCUMENTS

| | | |
|---|---|---|
| 10,429,126 B2 | 10/2019 | Park |
| 10,767,918 B2 | 9/2020 | Kim et al. |
| 2010/0326115 A1* | 12/2010 | Pae ................. E05B 1/0015 62/449 |
| 2014/0265805 A1 | 9/2014 | Chamberlin |
| 2018/0038626 A1 | 2/2018 | Kim et al. |
| 2018/0050898 A1 | 2/2018 | McMahan et al. |
| 2023/0341178 A1* | 10/2023 | Son ................. F25D 23/028 |

FOREIGN PATENT DOCUMENTS

| | | | | |
|---|---|---|---|---|
| EP | 3 789 713 A1 | | 3/2021 | |
| JP | 2017-522526 | | 8/2017 | |
| JP | 6437756 B2 | | 12/2018 | |
| KR | 10-2006-0004555 | | 1/2006 | |
| KR | 10-0764028 B1 | | 10/2007 | |
| KR | 20150071070 A | * | 6/2015 | |
| KR | 10-1578354 B1 | | 12/2015 | |
| KR | 10-1659180 | | 9/2016 | |
| KR | 10-1827173 B1 | | 2/2018 | |
| KR | 10-2022-0128676 | | 9/2022 | |
| WO | WO-2014208585 A1 | * | 12/2014 | .............. F25D 11/00 |
| WO | WO-2016021462 A1 | * | 2/2016 | ............. F25D 23/02 |

OTHER PUBLICATIONS

Written Opinion dated Apr. 9, 2024 for International Application No. PCT/KR2024/000423.

* cited by examiner

REFRIGERATOR INCLUDING TOUCH INTERFACE

CROSS-REFERENCE TO RELATED APPLICATIONS

This application is a continuation of International Application No. PCT/KR2024/000423 designating the United States, filed on Jan. 9, 2024, in the Korean Intellectual Property Receiving Office and claiming priority to Korean Patent Application Nos. 10-2023-0014416, filed on Feb. 2, 2023, and 10-2023-0050047, filed on Apr. 17, 2023, in the Korean Intellectual Property Office, the disclosures of each of which are incorporated by reference herein in their entireties.

BACKGROUND

Field

One or more embodiments of the disclosure relate to a refrigerator including a touch interface for operating a door opening device.

Description of Related Art

A touch key provided at a door of a refrigerator is a device that can open the door of the refrigerator by a touch of a user. The touch key is operated when a hand or a finger of the user is contacted at a portion to which a touch sensor reacts.

However, there has been difficulty for the user to intuitively identify which part of the touch key to touch. In addition, there has been difficulty for the user to recognize the touch key through the naked eye when the refrigerator is located at a dark place or if lighting is not turned-on at night. Accordingly, the user experienced an inconvenience of having to find the touch key by touch by approaching the refrigerator and tracing the door of the refrigerator.

SUMMARY

The disclosure relates to a refrigerator including a touch interface with greater visibility and improved touch sensitivity.

Aspects of embodiments of the disclosure will be set forth in part in the description which follows and, in part, will be apparent from the description, or may be learned by practice of the presented embodiments.

According to an embodiment of the disclosure, a refrigerator includes a main body configured with a storage compartment: a door configured to be rotatable to open and close the storage compartment; a touch interface on the door, and configured to sense a touch of a user; and a door opening device configured to rotate the door to open the storage compartment when the touch interface senses the touch of the user, wherein the touch interface includes an indicator configured to emit light out of the touch interface to assist a user to locate the touch interface.

According to an embodiment of the disclosure, the touch interface may include a cover on a side surface of the door. The indicator may be exposed to an outer side of the cover.

According to an embodiment of the disclosure, the indicator may be disposed toward a same direction as is a front surface of the door.

According to an embodiment of the disclosure, the indicator may protrude from one surface of the cover.

According to an embodiment of the disclosure, the touch interface may include at least one light source at an inner side of the cover, a light guide member configured to transfer incident light from the at least one light source to the indicator, a touch sensor configured to generate a touch signal by sensing the touch of the user, and a conductive member disposed between the indicator and the touch sensor.

According to an embodiment of the disclosure, the indicator may be integrally formed with the light guide member.

According to an embodiment of the disclosure, the conductive member may include a medium block adjacent to the indicator, and a transparent electrode on an outer surface of the medium block and electrically connected with the touch sensor. A portion of the transparent electrode may contact a back surface of the indicator.

According to an embodiment of the disclosure, the medium block may be transparent or semi-transparent.

According to an embodiment of the disclosure, the medium block may include one from among a porous foam, a silicon rubber, and a glass through which the incident light from the at least one light source reflected along an inside of the light guide member is passed.

According to an embodiment of the disclosure, the light guide member may include a first part adjacent to the at least one light source, and a second part extending longitudinally between the indicator and the first part, and in which the conductive member is inserted. The indicator may be integrally formed with the second part.

According to an embodiment of the disclosure, the light guide member may include a light leakage prevention film covering an outer surface of the light guide member.

According to an embodiment of the disclosure, the refrigerator may further include at least one processor configured to control the door opening device to rotate the door to open the storage compartment according to at least one instruction based on the sensing of the touch of the user.

According to an embodiment of the disclosure, the refrigerator may further include a distance sensor configured to sense an approach of a user within a pre-set distance range from the main body. The at least one processor may be configured to obtain a sensing signal from the distance sensor, and control at least one light source which provides light to the indicator to be turned on and off based on the obtained sensing signal.

According to an embodiment of the disclosure, the distance sensor may be in the touch interface.

According to an embodiment of the disclosure, the distance sensor may be on a front surface of the main body corresponding to a lower side of the door.

BRIEF DESCRIPTION OF THE DRAWINGS

These and/or other embodiments of the disclosure will become apparent and more readily appreciated from the following description of embodiments, taken in conjunction with the accompanying drawings of which.

DETAILED DESCRIPTION

Figure 1:
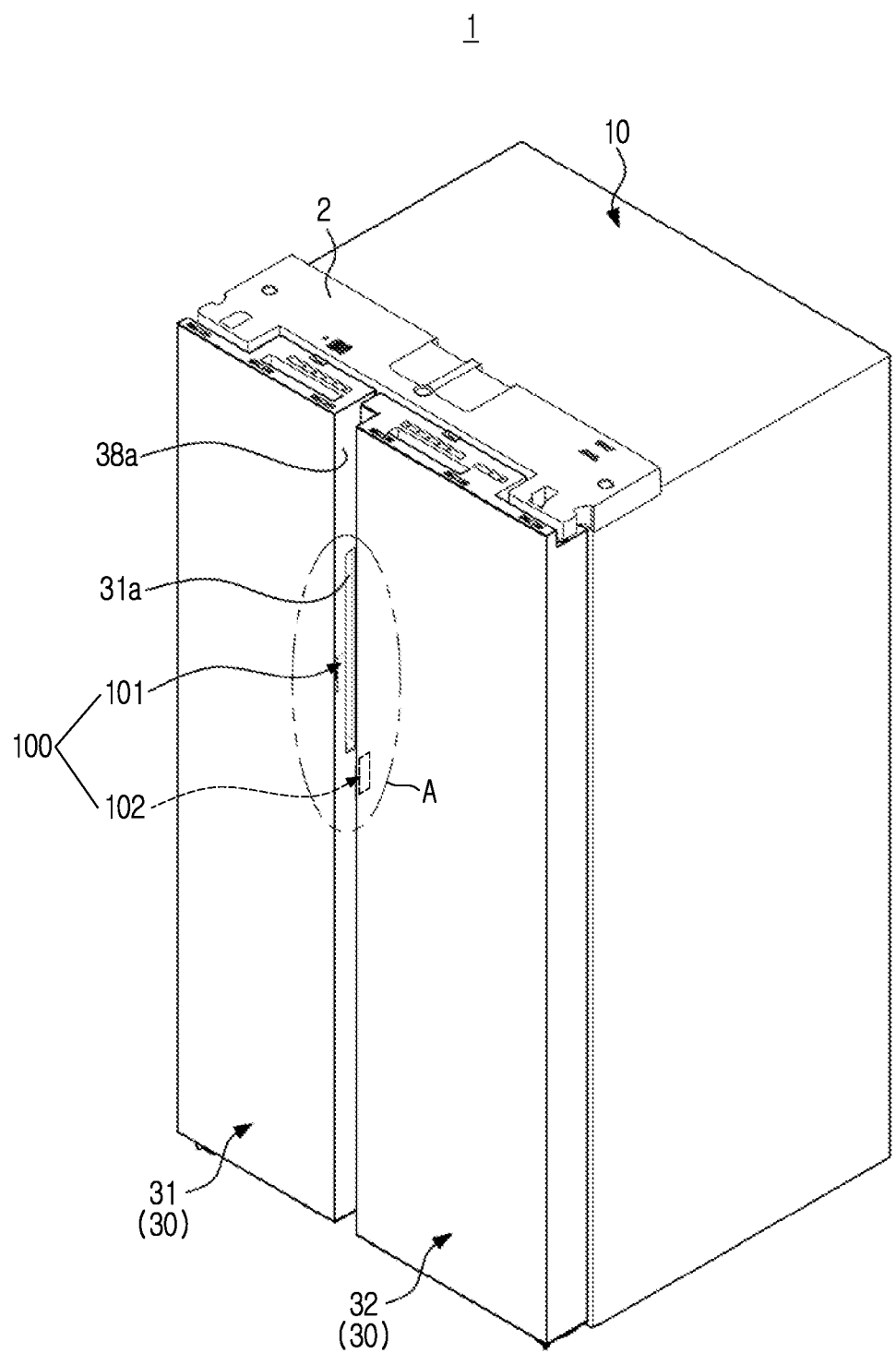
FIG. 1 is a perspective diagram illustrating a refrigerator according to one or more embodiments of the disclosure.

One or more embodiments described in the disclosure and configurations shown in the drawings are merely examples of the disclosure described, and various modified examples that can substitute the one or more embodiments and the drawings may be available at the time the disclosure was filed.

In addition, like reference numerals or symbols shown in each drawing of the disclosure represent a component or element that performs a substantially same function.

In addition, terms used in the disclosure have been used to describe one or more embodiments, is not intended to limit the disclosure described. A singular expression includes a plural expression, unless otherwise specified. It is to be understood that the terms such as "have" or "include" are used herein to designate a presence of a characteristic, a number, a step, an operation, an element, a component, or a combination thereof, and not to preclude a presence or a possibility of adding one or more of other characteristics, numbers, steps, operations, elements, components or a combination thereof.

In addition, terms including ordinal numbers such as "first" and "second" used herein may be used in describing various elements, but the elements are not limited by the above-described terms, and the terms may be used only for the purpose of distinguishing one element from another element. For example, a first element may be denoted as a second element, and similarly a second element may also be denoted as a first element without departing from the scope of the disclosure. The term "and/or" includes a combination of a plurality of items described in association or any item from among the plurality of items described in association.

Meanwhile, the terms such as a "front end", a "back end", an "upper part", a "lower part", a "front surface", a "back surface", an "upper end", and a "lower end" used in the description below are defined based on the drawings, and shapes and positions of each element are not limited by the terms.

In the disclosure, the expression 'same' may refer to not only fully matching, but also include a difference of an extent that considers a processing error range.

In the disclosure, a touch interface that senses a touch of a user may be referred as a touch device, a touch apparatus, a touch key, a touch key device, or a touch key apparatus.

In the disclosure, the touch interface of one or more embodiments has been described as applicable to a refrigerator, but is not limited thereto. For example, the touch interface may be applied to home appliances of various types such as, for example, and without limitation, an air conditioner, an air purifier, a cleaner, a cooking device, a dish washer, a clothing management device, a washer, and the like.

A refrigerator according to one or more embodiments will be described in detail below with reference to the accompanied drawings.

Figure 2:
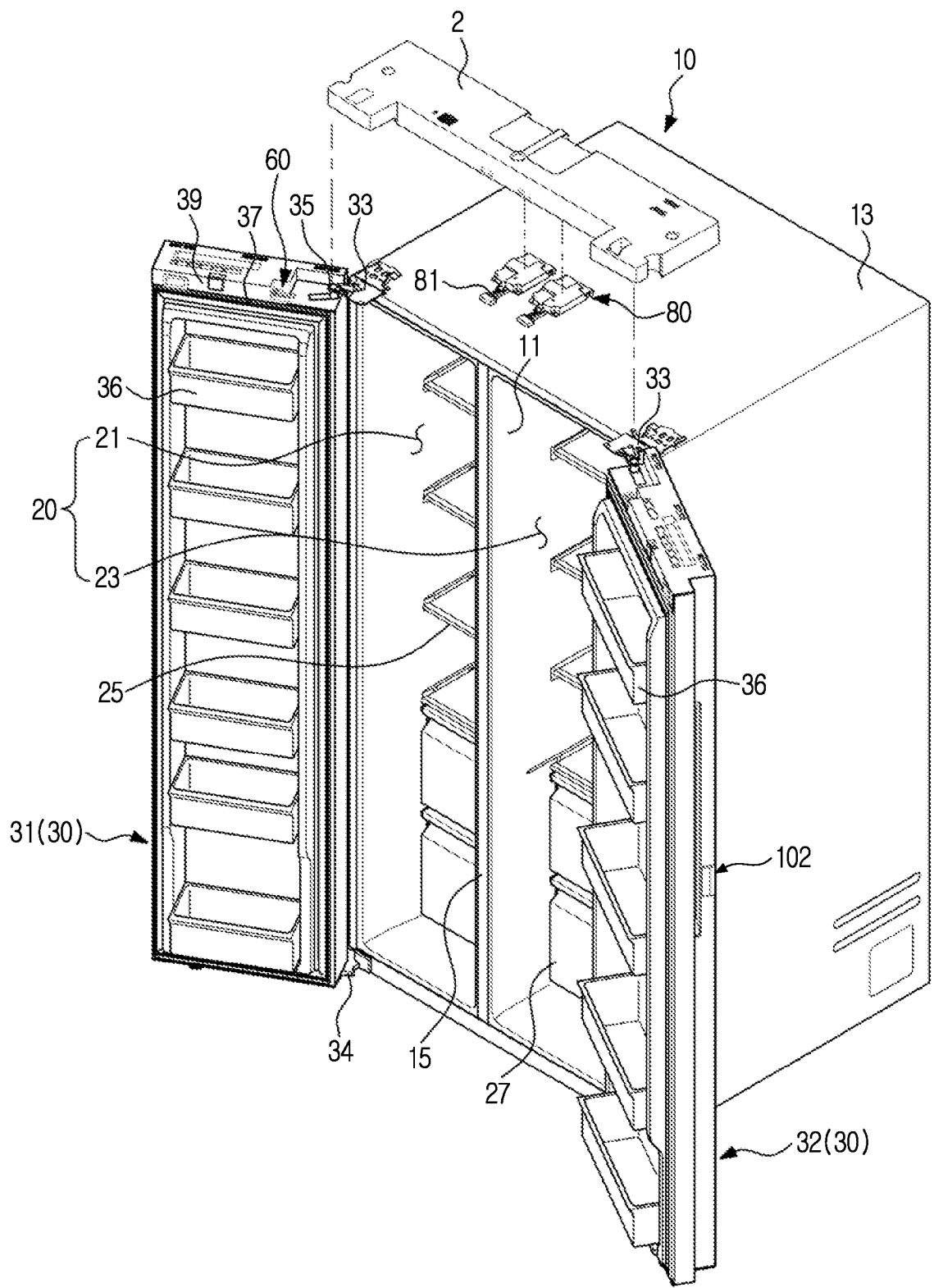
FIG. 2 is a diagram illustrating a view of a refrigerator with doors opened by a door opening device of the refrigerator according to one or more embodiments of the disclosure.
Figure 3:
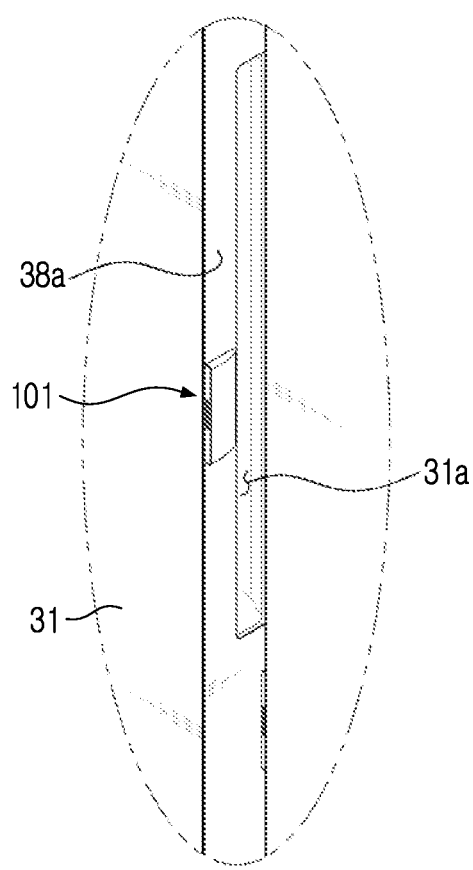
FIG. 3 is a diagram illustrating a touch interface by enlarging part A in FIG. 1.
Figure 4:
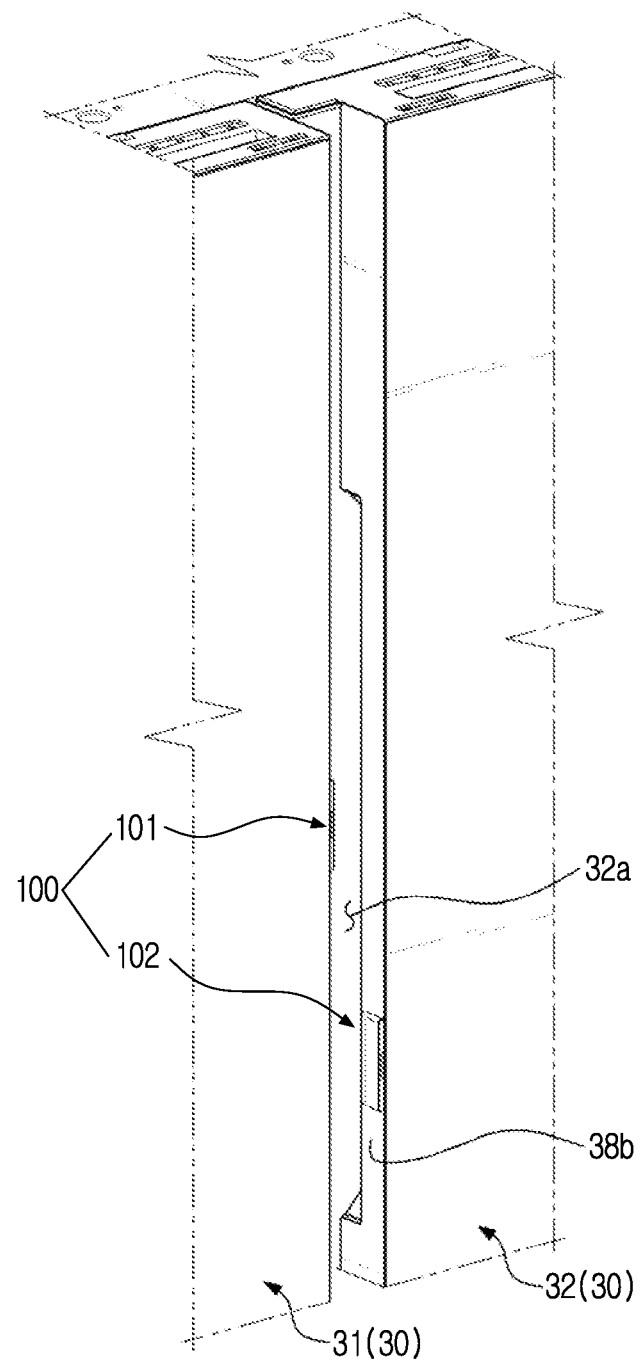
FIG. 4 is a diagram illustrating a view of a pair of touch interfaces of a refrigerator disposed at a plurality of doors according to one or more embodiments of the disclosure.

FIG. 1 is a perspective diagram illustrating a refrigerator according to one or more embodiments. FIG. 2 is a diagram illustrating a view of a refrigerator with doors opened by a door opening device of the refrigerator according to one or more embodiments. FIG. 3 is a diagram illustrating a touch interface by enlarging part A in FIG. 1. FIG. 4 is a diagram illustrating a view of a pair of touch interfaces of a refrigerator disposed at a plurality of doors according to one or more embodiments.

Referring to FIG. 1 to FIG. 4, a refrigerator 1 may include a main body 10, a storage compartment 20 provided in plurality for front surfaces thereof inside the main body 10 to be opened, a door 30 configured to open and close opened front surfaces of the storage compartment 20, and a cool air supplying device (not shown) configured to supply cool air inside the storage compartment 20.

The main body 10 may include an inner cabinet 11 that forms the storage compartment 20, and an outer cabinet 13 that forms an exterior. Between the inner cabinet 11 and the outer cabinet 13 and inside the door 30, an insulating material (not shown) may be foamed to prevent cool air leakage of the storage compartment 20.

The main body 10 may include the cool air supplying device that supplies cool air to the storage compartment 20. The cool air supplying device may be formed including a compressor, a condenser, an expansion valve, an evaporator, a blower fan, a cool air duct, and the like.

At a back lower side of the main body 10, a mechanical compartment (not shown), in which the compressor and the condenser which compresses a refrigerant and condenses the compressed refrigerant is to be installed, may be provided.

The evaporator configured to generate cool air, the blower fan configured to guide the cool air generated from the evaporator to inside the storage compartment 20, and the cool air duct configured to guide the cool air generated from the evaporator to the storage compartment 20 may be disposed at a back wall of the storage compartment 20. The evaporator, the blower fan, and the cool air duct may be respectively formed in plurality and configured to supply cool air to the storage compartment 20 independently.

The storage compartment 20 may be divided into a left storage compartment 21 and a right storage compartment 23 by a vertical partition wall 15. The left storage compartment 21 may be used as a refrigeration compartment, and the right storage compartment 23 may be used as a freezing compartment. However, the division and use of the storage compartment 20 as described above is merely one example, and is not limited to the above.

In the storage compartment 20, a plurality of shelves 25 may be provided dividing the storage compartment 20 into a plurality. In the storage compartment 20, a plurality of storage containers 27 capable of storing food products, and the like may be provided.

A plurality of doors 30 may be coupled to be rotatable to the main body 10 and configured to open and close the storage compartment 20. The plurality of doors 30 may include a first door 31 configured to open and close the refrigeration compartment which is the left storage compartment 21, and a second door 32 configured to open and close the freezing compartment which is the right storage compartment 23.

In the main body 10, hinges 33 and 34 to rotatably couple the plurality of doors 30 to the main body 10 may be provided. The hinges 33 and 34 may include a hinge shaft 35 for the plurality of doors 30 to be rotatably coupled to the main body 10. The plurality of doors 30 may be rotated based on the hinge shaft 35. The hinges 33 and 34 may include an upper hinge 33 provided at an upper part of the main body 10 and configured to rotatably couple the plurality of doors 30 to the main body 10. The hinges 33 and 34 may include a lower hinge 34 provided at a lower part of the main body 10 and configured to rotatably couple the plurality of doors 30 to the main body 10.

At a rear surface 39 of the plurality of doors 30, a door guard 36 configured to accommodate food products and the like may be installed in plurality. At the rear surface 39 of the plurality of doors 30, a gasket 37 which is in close contact with a front surface of the main body 10 so as to seal the storage compartment 20 may be provided when the plurality of doors 30 are closed.

At an upper surface of the main body 10, a top table 2 may be provided. The top table 2 may cover at least a portion of the upper hinge 33 such that the upper hinge 33 is not exposed to the outside.

At an inside of the top table 2, a door opening device 80 configured to automatically open and close the plurality of doors 30 may be provided. The door opening device 80 may be accommodated inside the top table 2. According to other embodiments, the door opening device may be accommodated inside the door 30. The top table 2 may be coupled at the upper surface of the main body 10 in a state in which the door opening device 80 is coupled to the top table 2. The door opening device 80 may be provided as a pair so as to correspond respectively to the first door 31 and the second door 32 provided at a left side and a right side of the main body 10, respectively. Because the pair of door opening devices 80 are substantially the same configuration, only one door opening device 80 will be described.

The door opening device 80 may include a pusher 81 configured to push the rear surface 39 of the door 30 toward a front direction and open the plurality of doors 30. The pusher 81 may be provided so as to be movable toward the front and back directions. The pusher 81 moved toward the front direction may be configured to push the rear surface 39 of the door 30 and the plurality of doors 30 may be opened.

That is, the door opening device 80 may be configured to open a certain part of the plurality of doors 30 such that the user is able to open the plurality of doors 30 with little force.

At a side surface 38a of the first door 31, a recessed first handle 31a may be formed for the user to insert a hand and grab. The first handle 31a may be formed so as to be recessed at the side surface 38a of the first door 31, and formed only at a portion of a section and not formed at a whole section between the upper end and the lower end of the first door 31. Accordingly, an inner space of the first door 31 may be increased because a remaining space excluding the portion of the section occupied by the first handle 31a can be utilized as the inner space of the first door 31.

At a side surface 38b of the second door 32, a recessed second handle 32a may be formed for the user to insert a hand and grab. The second handle 32a may be formed so as to be recessed at the side surface 38b of the second door 32, and formed only at a portion of a section and not formed at a whole section between the upper end and the lower end of the second door 32. Accordingly, an inner space of the second door 32 may be increased because a remaining space excluding the portion of the section occupied by the second handle 32a can be utilized as the inner space of the second door 32.

The door opening device 80 may be operated through a plurality of touch key apparatuses. The user may operate the door opening device 80 by operating a pair of touch interfaces 100. The pair of touch interfaces 100 may be operated by the touch of the user.

The pair of touch interfaces 100 may include a first touch interface 101 provided at the first door 31, and a second touch interface 102 provided at the second door 32. The first touch interface 101 may sense a touch of the user. The first touch interface 101 may generate a touch signal by the touch of the user. A processor 191 (referring to FIG. 10) may be configured to receive the touch signal generated from the first touch interface 101. The processor 191 may generate a control signal operating the door opening device 80 based on the touch signal. The door opening device 80 that received the control signal may be operated to open the first door 31.

The second touch interface 102 may be configured to sense the touch of the user similarly as with the first touch interface 101. The second touch interface 102 may generate a touch signal by the touch of the user. The processor 191 may receive the touch signal generated from the second touch interface 102. The processor 191 may generate the control signal that operates the door opening device 80 based on the touch signal. The door opening device 80 that received the control signal may be operated to open the second door 32.

The first touch interface 101 may be provided at the side surface 38a of the first door 31. The first touch interface 101 may be positioned at the front direction, or forward, of the first handle 31a formed at the side surface 38a of the first door 31. Accordingly, the first touch interface 101 may be touched simultaneously with a motion by the user of grabbing the first handle 31a with the hand. In this case, as light is emitted from a portion (e.g., indicator 136, referring to FIG. 5) of the first touch interface 101, the user may easily and accurately recognize a touch position of the first touch interface 101. At least a portion of the first touch interface 101 may be provided so as to protrude from the side surface 38a of the first door 31. Because of the structure described above, the user may be able to grab the first handle 31a more conveniently.

The second touch interface 102 may be provided at the side surface 38b of the second door 32. The second touch interface 102 may be positioned at the front direction, or forward, of the second handle 32a formed at the side surface 38b of the second door 32. Accordingly, the second touch interface 102 may be touched with a hand of the user simultaneously with a motion by the user of grabbing the second handle 32a with the hand. At least a portion of the second touch interface 102 may be provided so as to protrude from the side surface 38b of the second door 32. Because of the structure described above, the user may be able to grab the second handle 32a more conveniently.

Heights of the first touch interface 101 and the second touch interface 102 may vary. Because the height of the first touch interface 101 and the height of the second touch interface 102 vary, the second touch interface 102 may be prevented from being touched unintentionally when touching the first touch interface 101. In addition, when touching the second touch interface 102, the first touch interface 101 may be prevented from being touched intentionally when touching the second touch interface 102. Through the above, the door opening device 80 may be prevented from malfunctioning.

A pair of touch interfaces 100 will be described below with reference to the drawing. Because the first touch interface 101 and the second touch interface 102 are substantially the same configuration, only the first touch interface 101 will be described.

Figure 5:
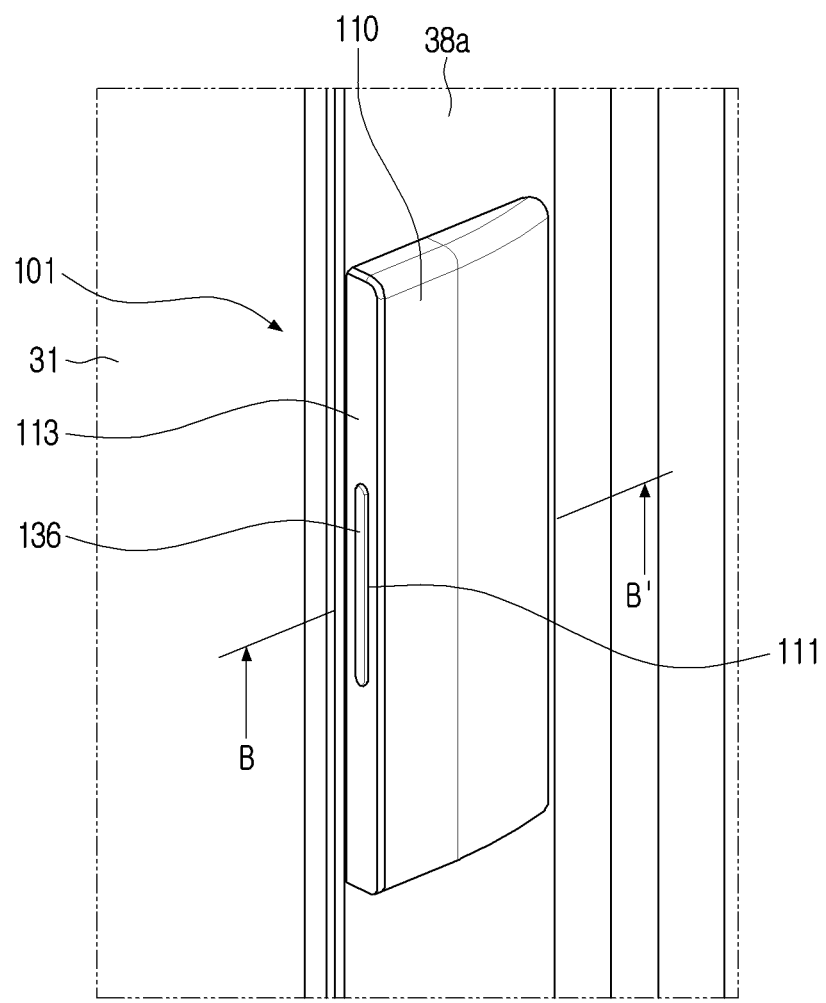
FIG. 5 is a diagram illustrating a first touch interface disposed at a first door of a refrigerator according to one or more embodiments of the disclosure.
Figure 6:
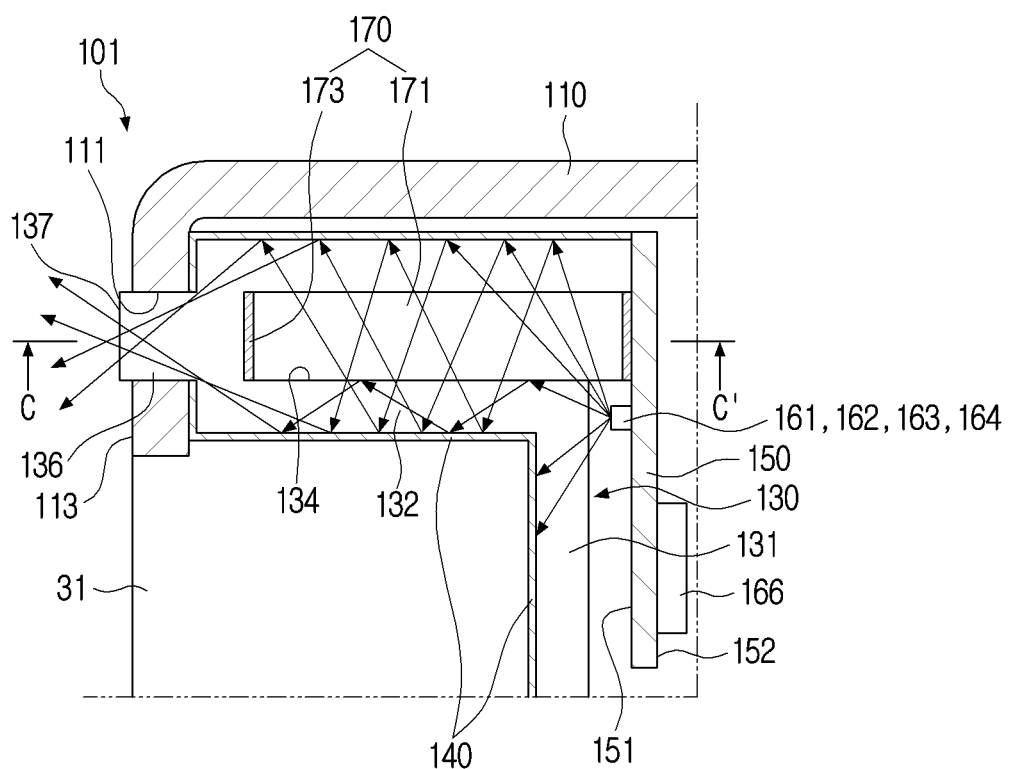
FIG. 6 is a cross-sectional diagram taken along line B-B' indicated in FIG. 5.
Figure 7:
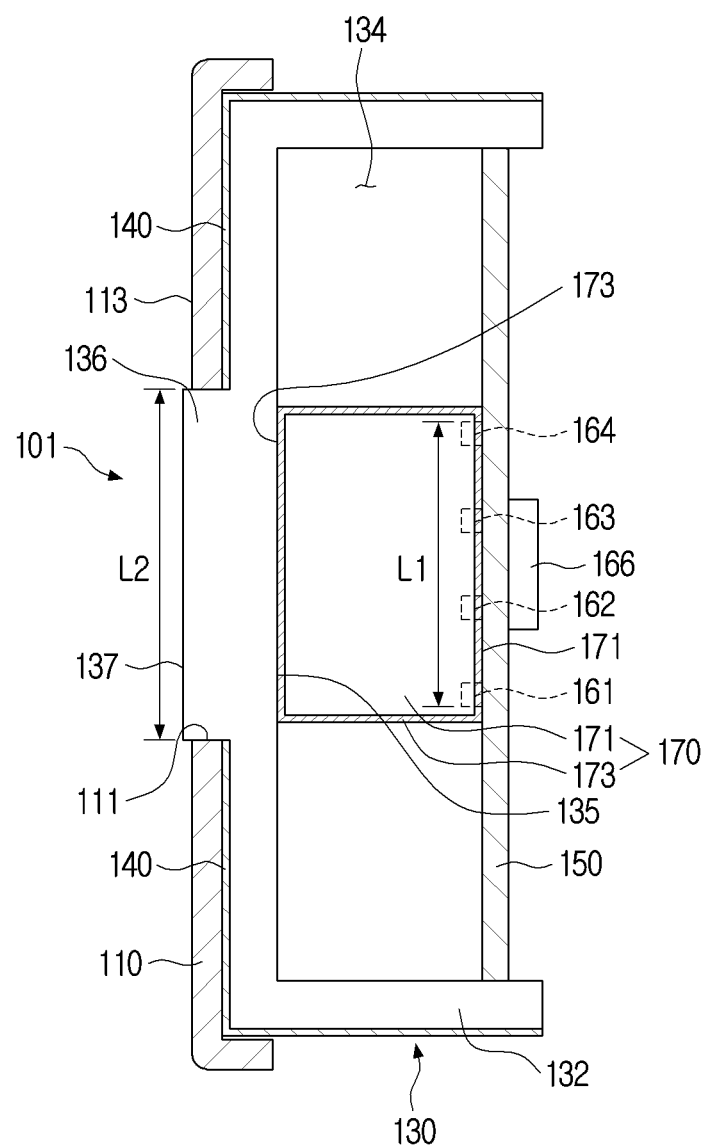
FIG. 7 is a cross-sectional diagram taken along line C-C' indicated in FIG. 6.

FIG. 5 is a diagram illustrating a first touch interface disposed at a first door of a refrigerator according to one or more embodiments of the disclosure. FIG. 6 is a cross-sectional diagram taken along line B-B' indicated in FIG. 5. FIG. 7 is a cross-sectional diagram taken along line C-C' indicated in FIG. 6.

Referring to FIG. 5 to FIG. 7, the first touch interface 101 may include a cover 110 disposed at the side surface 38a of the first door 31, a light guide member 130 disposed inside the cover 110, a printed circuit board 150, a plurality of light sources 161, 162, 163, and 164 arranged at a first surface of the printed circuit board 150 facing the light guide member 130, and a touch sensor 166 mounted to a second surface 152 positioned at an opposite side of a first surface 151 of the printed circuit board 150. The light source may be a configuration for providing light toward a side of the indicator. Although the plurality of light sources have been shown in the drawings, the light sources may be implemented as one according to an embodiment.

A front end surface 113 of the cover 110 may be disposed to face the front direction of the refrigerator. At the front end surface 113 of the cover 110, an insertion hole 111 in which the indicator 136 which is a part of the light guide member 130 is to be inserted may be provided. In this case, the indicator 136 may be exposed toward the outer side of the cover 110 through the insertion hole 111 of the cover 110. In the disclosure, the indicator refers to a part notifying the user of the touch position of the touch interface. For example, the indicator may be implemented as a part that diverges light so as to recognize the touch position, and may be referred to in various terms such as a light emitting part, an identification part, and a display part.

The indicator 136 exposed toward the outer side of the cover 110 may receive light emitted from the plurality of light sources 161, 162, 163, and 164 and emit the light toward the outer side of the cover 110. Accordingly, if the place at which the refrigerator is disposed is a dark place where external light is not reached or indoor light is not turned on during night time, the user may easily check the indicator 136 which is a touch point of the first touch interface 101. Accordingly, the first touch interface 101 may be improved in visibility by the indicator 136 that emits light.

A size of the insertion hole 111 of the cover 110 may correspond to a size of the light guide member 130. For example, a width and length of the insertion hole 111 of the cover 110 may be substantially the same as a width and length of the indicator 136, respectively. Referring to FIG. 5, the insertion hole 111 of the cover 110 may be formed in a narrow and long straight line shape to correspond to a shape of the indicator 136.

The insertion hole 111 of the cover 110 is not limited to the above-described straight line shape. For example, if the indicator 136 has an arc shape with a predetermined curvature, the insertion hole of the cover 110 may be formed in an arc shape corresponding to the shape of the indicator 136.

The front end surface 113 of the cover 110 may be positioned on a same plane as with the front surface of the first door 31, but is not limited thereto. For example, the front end surface 113 of the cover 110 may be disposed in an inserted state by a predetermined distance (e.g., within several mm) toward the back direction of the refrigerator than the front surface of the first door 31.

The light guide member 130 may be provided at the first door 31. In this case, the light guide member 130 may be configured such that the remaining part excluding the indicator 136 is covered by the cover 110 and not exposed to the outside of the first door 31.

The light guide member 130 may include a first part 131 configured to which faces with the first surface 151 of the printed circuit board 150 and to which light from the plurality of light sources 161, 162, 163, and 164 is incident, and a second part 132 which is extended to the first part 131 and reflects light reflected through the first part 131 to the indicator 136. The second part 132 of the light guide member 130 may be integrally formed with the indicator 136 at the front end. The light guide member 130 may be manufactured to have various shapes by injection molding.

The first part 131 of the light guide member 130 may be disposed at an inner side of the first door 31 and disposed so as to face a portion area of the first surface 151 of the printed circuit board 150. The second part 132 of the light guide member 130 may be extended from the first part 131 of the light guide member 130 and disposed toward an inner side of the front end of the cover 110. In this case, the first part 131 and the second part 132 of the light guide member 130 may be disposed approximately perpendicular, but is not limited thereto, and may be disposed at various angles.

The indicator 136 may be exposed to the outer side of the cover 110 based on it being inserted in the insertion hole 111 of the cover 110. The indicator 136 may be configured such that a front end surface 137 is protruded from the front end surface 113 of the cover 110 by a predetermined length. In this case, the indicator 136 may be configured such that a portion of four side surfaces surrounding the front end surface 137 may be exposed to the outer side of the cover 110. Accordingly, light emitted to the outer side of the cover 110 through the indicator 136 may be emitted through the front end surface 137 of the indicator 136 and a portion of the four side surfaces surrounding thereof.

The indicator 136 is not limited to protruding from the insertion hole 111 of the cover 110. For example, the front end surface 137 of the indicator 136 may be positioned on a same surface as with the front end surface 113 of the cover 110. In addition, the front end surface 137 of the indicator 136 may be positioned inserted toward an inner side of the cover 110 by a predetermined depth than the front end surface 113 of the cover 110 in an inserted state in the insertion hole 111 of the cover 110.

The indicator 136 may be formed approximately in a straight line form along a longitudinal direction of the front end surface 113 of the cover 110. Referring to FIG. 7, the length of the indicator 136 may correspond to approximately one third of the length of the front end surface 113 of the cover 110 approximately. However, the length of the indicator 136 is not limited thereto, and may be shorter than one fourth of the length of the front end surface 113 of the cover 110 or longer than one half of the length of the front end surface 113 of the cover 110.

The indicator 136 is not limited to the straight line shape. For example, the indicator 136 may be formed in an arc shape having a predetermined curvature along the longitudinal direction of the front end surface 113 of the cover 110, an S-shape, a zigzag shape, a wedge shape that narrows in width from one end as it reaches other end, or a hidden line shape. In this case, the insertion hole 111 of the cover 110 may be formed in a shape corresponding to the indicator 136.

Figure 8:
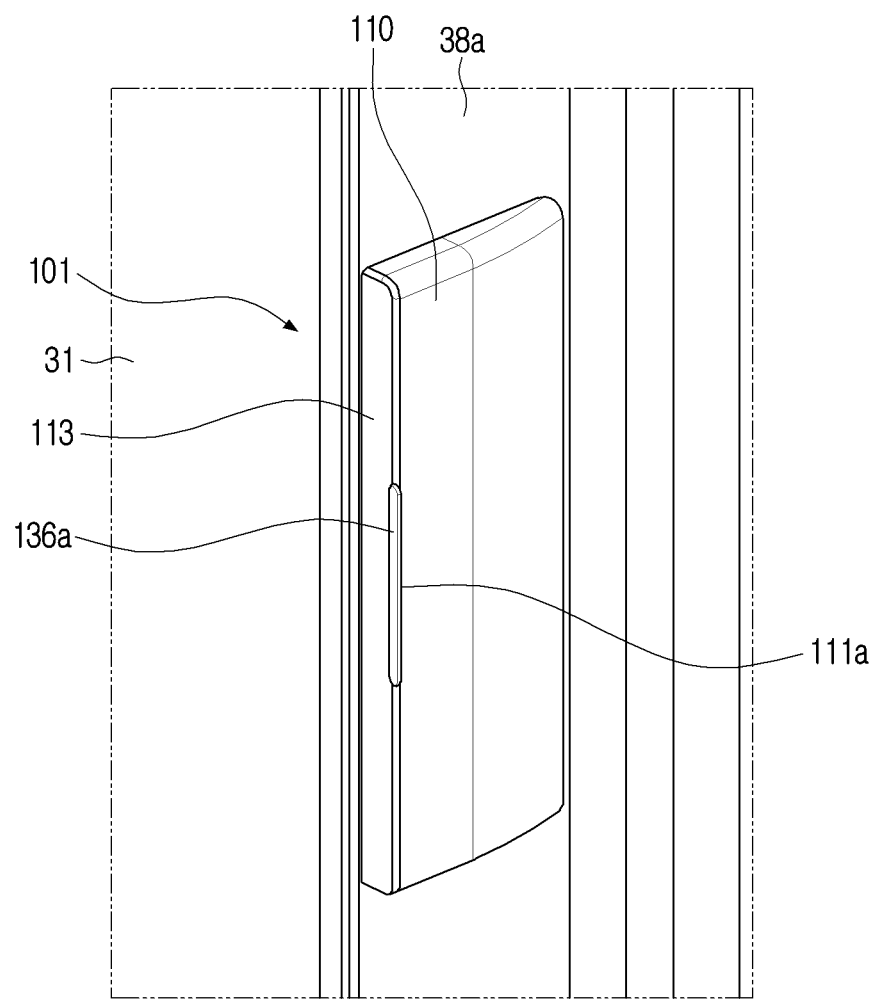
FIG. 8 and FIG. 9 are diagrams illustrating examples of an indicator included in a touch interface of a refrigerator disposed at various positions according to one or more embodiments of the disclosure.
Figure 9:
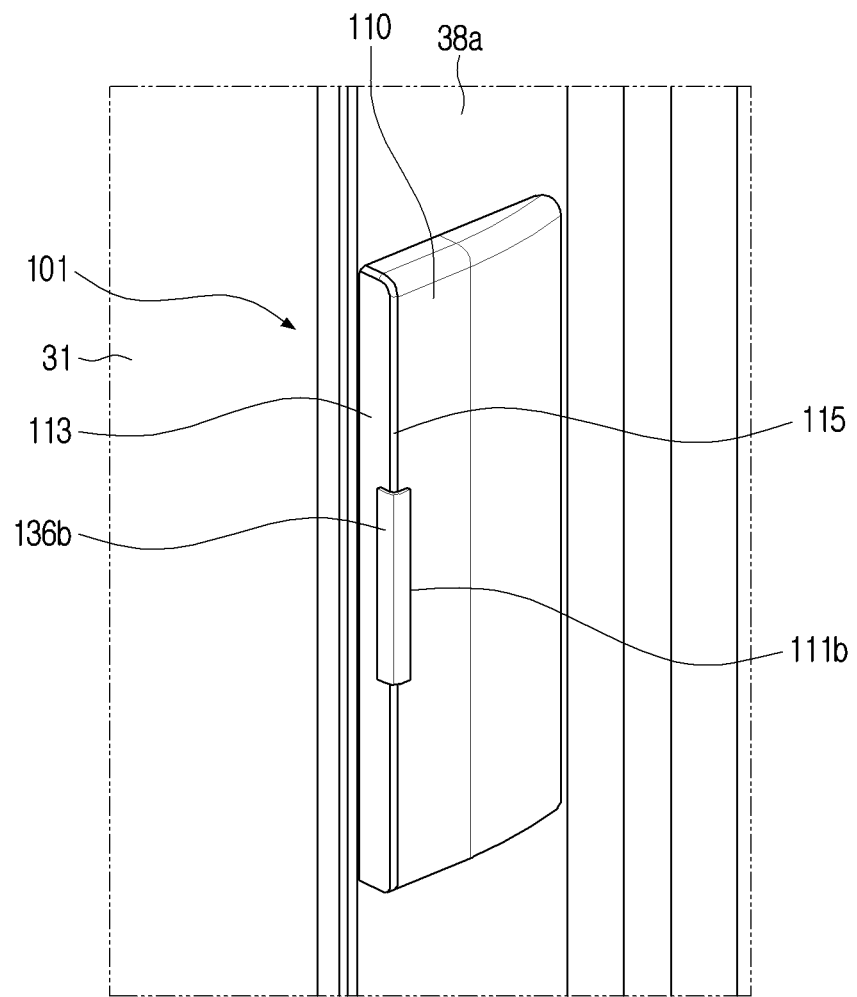

FIG. 8 and FIG. 9 are diagrams illustrating examples of an indicator included in a touch interface of a refrigerator disposed at various positions according to one or more embodiments.

An indicator 136a is not limited to being formed only at the front end surface 113 of the cover 110. Referring to FIG. 8, the indicator 136a may be formed along a corner 115 of the cover 110 adjacent to the front end surface 113 of the cover 110. In this case, an insertion hole 111a of the cover 110 may be formed along the corner 115 of the cover 110 for the indicator 136a to be inserted.

Referring to FIG. 9, an indicator 136b may be lengthened in width and disposed so as to occupy the front end surface 113, the corner 115, and a side surface 117 of the cover 110 together therewith. In this case, an insertion hole 111b of the cover 110 may be formed to pass through the front end surface 113, the corner 115, and the side surface 117 of the cover 110 for the indicator 136b to be inserted.

The indicator 136 may be formed into various shapes suited to a design of a whole refrigerator or a design of a refrigerator door.

The light guide member 130 may be formed of a material that reflects light incident from the plurality of light sources 161, 162, 163, and 164 to an inside of the light guide member 130. The light guide member 130 may be a material which is transparent or semi-transparent with a greater refractive index than a refractive index of an external environment such as air. For example, the light guide member 130 may be formed of materials such as poly (methyl methacrylate) (PMMA) and polycarbonate (PC) which has high transmissivity and durability.

Referring to FIG. 6 and FIG. 7, the light guide member 130 may include a light leakage prevention film 140 which covers an outer surface of the light guide member 130. At the outer surface of the indicator 136 and a portion area of the light guide member 130 to which light is incident from the plurality of light sources 161, 162, 163, and 164, the light leakage prevention film 140 may not be formed. In this case, the portion area of the light guide member 130 to which light is incident may be an area corresponding to the plurality of light sources 161, 162, 163, and 164 in the first part 131 of the light guide member 130 or an area at which the first part 131 and the second part 132 of the light guide member 130 are connected.

The light leakage prevention film 140 may minimize an amount of light in which light incident from the plurality of light sources 161, 162, 163, and 164 is not reflected toward the side of the indicator 136. Accordingly, the light emitted through the indicator 136 may maintain a certain brightness.

Referring to FIG. 6 and FIG. 7, the plurality of light sources 161, 162, 163, and 164 may be light emitting diodes used as point light sources. The plurality of light sources 161, 162, 163, and 164 may be mounted on the printed circuit board with a predetermined distance therebetween. The light emitting diodes may have a wavelength corresponding to at least any one color from among a red color, a green color, a blue color, or a white color.

The plurality of light sources 161, 162, 163, and 164 may be disposed adjacently to the back end of the second part 132 of the light guide member 130 as shown in FIG. 6. The plurality of light sources 161, 162, 163, and 164 may be disposed in one line at a position corresponding to the indicator 136 on the printed circuit board 150 as shown in FIG. 7. As described above, brightness of the indicator 136 may be increased according to the plurality of light sources 161, 162, 163, and 164 being disposed to correspond to the indicator 136.

A length L1 arranged with the plurality of light sources 161, 162, 163, and 164 may correspond to a length L2 of the indicator 136 or may be shorter than the length L2 of the indicator 136, but is not limited thereto. For example, the length L1 arranged with the plurality of light sources 161, 162, 163, and 164 may be longer than the length L2 of the indicator 136. That is, two light sources 162 and 163 may be at a position corresponding to the indicator 136, and the remaining two light sources 161 and 164 may be positioned at a distance exceeding the upper and lower sides of the indicator 136.

The positions of the plurality of light sources 161, 162, 163, and 164 are not limited to FIG. 6, and may be disposed at the first surface 151 of the printed circuit board 150 corresponding to a part at which the first part 131 and the second part 132 of the light guide member 130 are connected.

The plurality of light sources 161, 162, 163, and 164 may be disposed to be spaced apart with a predetermined distance therebetween from the first part 131 of the light guide member 130 as shown in FIG. 6, but is not limited thereto. The plurality of light sources 161, 162, 163, and 164 may be contacted with the first part 131 of the light guide member 130. To this end, a height of a conductive member 170 may be lowered and the printed circuit board 150 may be disposed closely toward the side of the first part 131 of the light guide member 130.

The first touch interface 101 according to one or more embodiments has been described as including a plurality of light sources as described above, but is not limited thereto. For example, the first touch interface 101 may have at least one light source according to a size of the light source or an intensity of light.

Referring to FIG. 6 and FIG. 7, the first touch interface 101 may include the touch sensor 166, and the conductive member 170 disposed in an inner space 134 of the light guide member 130 between the indicator 136 and the printed circuit board 150.

The printed circuit board 150 may be disposed at an inner side of the light guide member 130. At the first surface 151 of the printed circuit board 150, the plurality of light sources 161, 162, 163, and 164 may be disposed, and at the second surface 152 of the printed circuit board 150, the touch sensor 166 and devices forming an electric circuit may be mounted.

The touch sensor 166 may be a touch sensor operating in a capacitance method. The touch sensor 166 mounted to the second surface 152 of the printed circuit board 150 may be electrically connected with a terminal provided at the first surface 151 of the printed circuit board 150 through a via provided at the printed circuit board 150. Accordingly, the touch sensor 166 may be electrically connected with a transparent electrode 173.

A thickness of the touch sensor 166 may be thicker than a thickness of the plurality of light sources 161, 162, 163, and 164. Accordingly, if the touch sensor 166 is mounted to the first surface 151 of the printed circuit board 150 disposed with the plurality of light sources 161, 162, 163, and 164, the first part 131 of the light guide member 130 may interfere with the touch sensor 166 and a distance between the plurality of light sources 161, 162, 163, and 164 and the first part 131 of the light guide member 130 may be increased. Based on the above, because the space between the plurality of light sources 161, 162, 163, and 164 is widened and the intensity of light emitted through the indicator 136 is lowered, brightness may be reduced.

However, if the first part 131 of the light guide member 130 is changed to a shape that can avoid the touch sensor 166, or if the length of the printed circuit board 150 is formed longer such that the touch sensor 166 is at the position that does not interfere with the first part 131 of the light guide member 130, the touch sensor 166 may be mounted to the first surface 151 of the printed circuit board 150. If the touch sensor 166 is mounted to the first surface 151 of the printed circuit board 150, the touch sensor 166 may be electrically connected with the transparent electrode 173 through wiring formed at the first surface 151 of the printed circuit board 150.

The conductive member 170 may include a medium block 171, and the transparent electrode 173 disposed along a side surface of the medium block 171 and electrically connected with the touch sensor 166. The transparent electrode 173 may include indium tin oxide (ITO). The transparent electrode 173 may have a form of a film or a thin film. The transparent electrode 173 may be in contact with an inner surface 135 of the light guide member 130.

The medium block 171 may be formed of a transparent material for light incident from the plurality of light sources 161, 162, 163, and 164 to the first part 131 and/or the second part 132 of the light guide member 130 to be directed to the indicator 136 along an inside of the second part 132 of the light guide member 130 without interfering with the medium block 171. For example, the medium block 171 may be a silicon rubber formed transparently with a predetermined elasticity. However, the medium block 171 may be formed of a transparent glass, or formed of a porous foam having a porosity to an extent that light emitted from the plurality of light sources 161, 162, 163, and 164 is able to pass to some extent. For example, the medium block 171 may be implemented as a form including one from among the porous foam, the silicon rubber, and the glass through which light reflected along the inside of the light guide member 130 is passed.

The medium block 171 may fill in a gap between a back surface of the indicator 136 and the first surface 151 of the printed circuit board 150.

The transparent electrode 173 may be supported by the medium block 171 and one side of the transparent electrode 173 is contacted at the back surface of the indicator 136. An opposite side (or other side) of the transparent electrode 173 may be electrically connected to the terminal provided at the first surface 151 of the printed circuit board 150. Accordingly, because the first touch interface 101 can raise a signal-to-noise ratio (SNR) by removing an air gap between the indicator 136 and the conductive member 170, a higher touch sensitivity may be secured.

Figure 10:
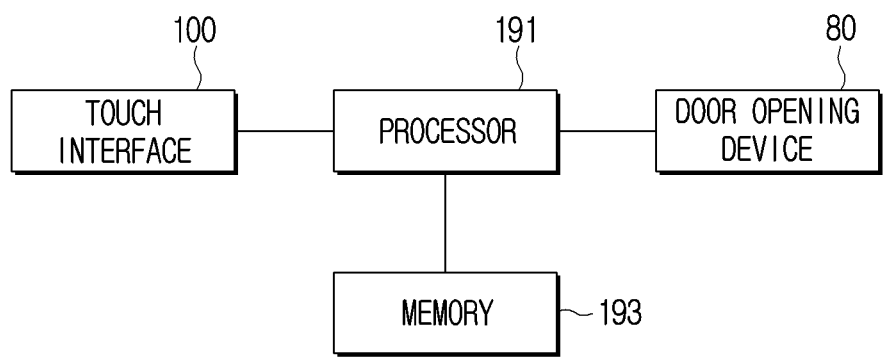
FIG. 10 is a block diagram illustrating a schematic configuration of a refrigerator according to one or more embodiments of the disclosure.

FIG. 10 is a block diagram illustrating a schematic configuration of an electronic device operating a touch interface of a refrigerator according to one or more embodiments.

Referring to FIG. 10, the refrigerator 1 according to one or more embodiments may include the door opening device 80, the plurality of light sources 161, 162, 163, and 164, the touch sensor 166, the processor 191, and a memory 193.

The processor 191 may control the overall operation of the refrigerator. The processor 191 may include at least one processor. The processor 191 perform a predetermined operation by executing at least one instruction or command stored in the memory 193. In addition, the processor 191 may control operations of the elements provided in the refrigerator. The processor 191 may include at least one or a combination from among a central processing unit (CPU), a graphics processing unit (GPU), or a neural processing unit (NPU).

The pair of touch interfaces 100 (101 and 102) may include the first touch interface 101 and the second touch interface 102. The first touch interface 101 may identify whether there is a touch of the user for the first door 31. The second touch interface 102 may identify whether there is a touch of the user for the second door 32. The first touch interface 101 and the second touch interface 102 may provide touch signals related to whether there is a touch of the user to the processor 191. The processor 191 may control, based on the touch signal, the door opening device 80 to open the first door 31 or the second door 32.

The processor 191 may receive a touch signal from the pair of touch interfaces 100. For example, the processor 191 may receive a touch signal for the first door 31 from the first touch interface 101, and receive a touch signal for the second door 32 from the second touch interface 102. The processor 191 may identify, based on the touch signals received from the pair of touch interfaces 100, whether there is a touch of the user for the plurality of doors 30.

The pair of touch interfaces 100 may sense whether the user has touched the indicator 136 of the respective touch interfaces. The pair of touch interfaces 100 may include the touch sensor 166 configured to measure a delta of capacitance by the touch sensor 166, and the processor 191 configured to control the door opening device by comparing the delta of capacitance measured by the touch sensor 166 with a value X of threshold voltage (hereinafter, referred to as T/H).

The processor 191 may compare the delta of capacitance with a pre-set threshold value X. If the delta of capacitance is greater than or equal to the threshold value X, the processor 191 may determine that the user has touched the indicator 136, and may open the door 31 by controlling the door opening device 80. If the delta of capacitance is less than the threshold value X, the processor 191 may determine that the user has not touched the indicator 136, and may not operate the door opening device 80. Accordingly, the first door 31 may be maintained in a closed state.

The processor 191 may generate a light source control signal for controlling the plurality of light sources 161, 162, 163, and 164 included in the pair of touch interfaces 100. For example, the processor 191 may provide the light source control signal to the plurality of light sources 161, 162, 163, and 164 for the plurality of light sources 161, 162, 163, and 164 to maintain a turned-on state at all times.

The processor 191 may control an amount of current to be applied to the plurality of light sources 161, 162, 163, and 164 and control brightness of light or color emitted from the plurality of light sources 161, 162, 163, and 164. Accordingly, the first touch interface 101 may enhance an aesthetic sense of the refrigerator by emitting light of a color that suits the design of the refrigerator or the design of the refrigerator door.

The processor 191 may provide, based on the touch signal, a control signal to the door opening device 80. For example, the processor 191 may provide a control signal for a rotation operation of a motor included in the door opening device 80. The control signal may include, for example, a direction control signal controlling a rotation direction of the motor, a pulse width modulation (PWM) signal controlling a rotation speed of the motor, a brake signal stopping the rotation operation of the motor, and the like.

The processor 191 may control, based on the touch signal sensed from any one touch interface from among the pair of touch interfaces 100, the door opening device 80 to open any one door. For example, the processor 191 may provide the direction control signal, the PWM signal, the brake signal, or the like to the motor to open any one door.

The memory 193 may store various information, data, commands, programs, at least one instruction, and the like necessary in an operation of the refrigerator 1. The instruction may refer to various program commands, and the like executed by the processor 191. The processor 191 may perform, when a touch is sensed through the touch interfaces 100, operations such as opening doors by controlling the door opening device 80 according to the at least one instruction stored in the memory 193.

The memory 193 may include at least one or a combination of a volatile memory or a non-volatile memory. The memory 193 may include a storage medium of at least one type from among a flash memory type, a hard disk type, a multimedia card micro type, a memory of a card type (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the refrigerator according to one or more embodiments, because the plurality of doors 31 and 32 can be automatically opened through a touch of the pair of touch interfaces 100, the user may not directly open the plurality of doors 30. Accordingly, user convenience may be enhanced.

The refrigerator 1 according to one or more embodiments may include a communication module. The communication module may be configured to communicate with external devices such as a server, a mobile device, other home appliances, and the like through an access point (AP) nearby. The access point (AP) may connect a local area network (LAN) to which the refrigerator or a user device is connected to a wide area network (WAN) to which the server is connected. The refrigerator or the user device may be connected to the server through the wide area network (WAN). An input interface may include a key, a touch screen, a microphone, and the like. The input interface may receive a user input and transfer to the processor. An output interface may include a display, a speaker, and the like. The output interface may output various notifications, messages, information, and the like generated from the processor.

The touch interfaces 100 have been described in an example in which the plurality of light sources is turned-on at all times while power is applied to the refrigerator, but is not limited thereto. For example, the refrigerator 1 may be configured to sense whether the user approached the refrigerator 1, and control the on and off by controlling the plurality of light sources 161, 162, 163, and 164 based therefrom. The above will be described below with reference to the drawings.

Figure 11:
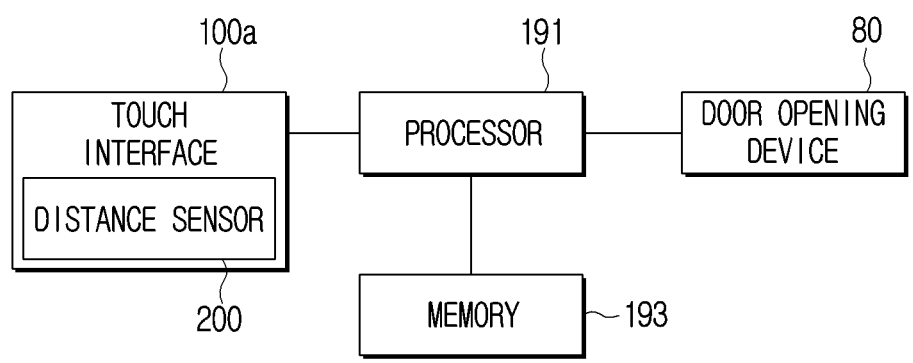
FIG. 11 is a block diagram illustrating a schematic configuration in which a distance sensor is added to a touch interface of a refrigerator according to one or more embodiments of the disclosure.
Figure 12:
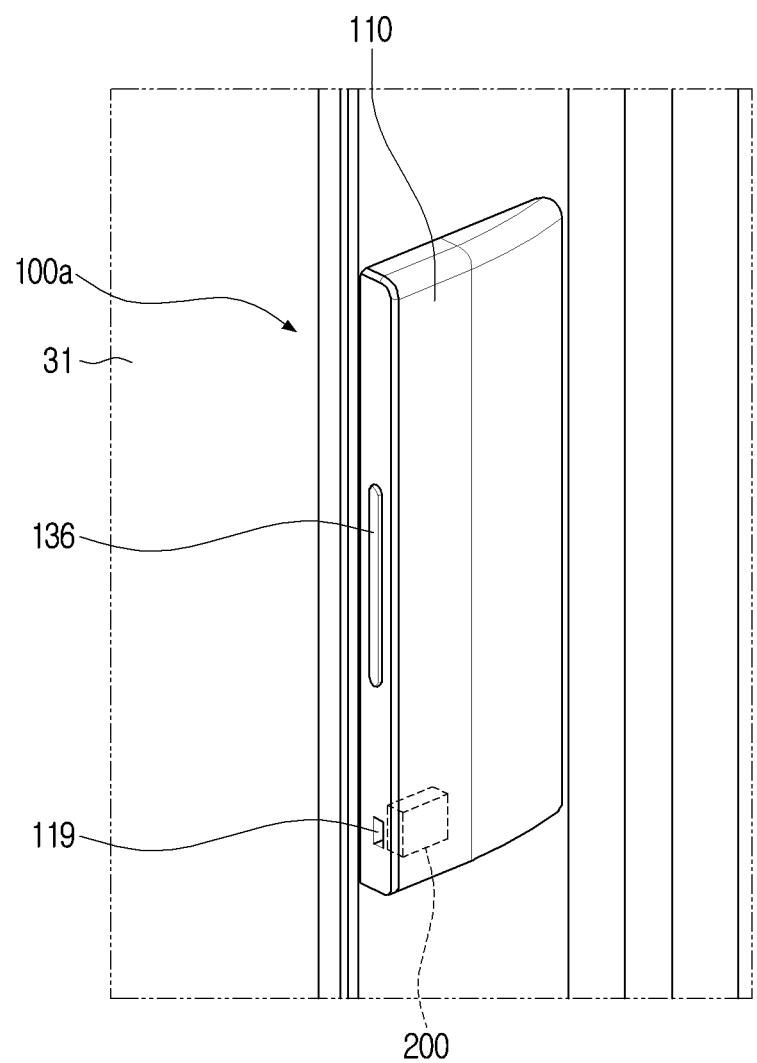
FIG. 12 is a perspective diagram illustrating an example of a distance sensor added to a touch interface of a refrigerator according to one or more embodiments of the disclosure.
Figure 13:
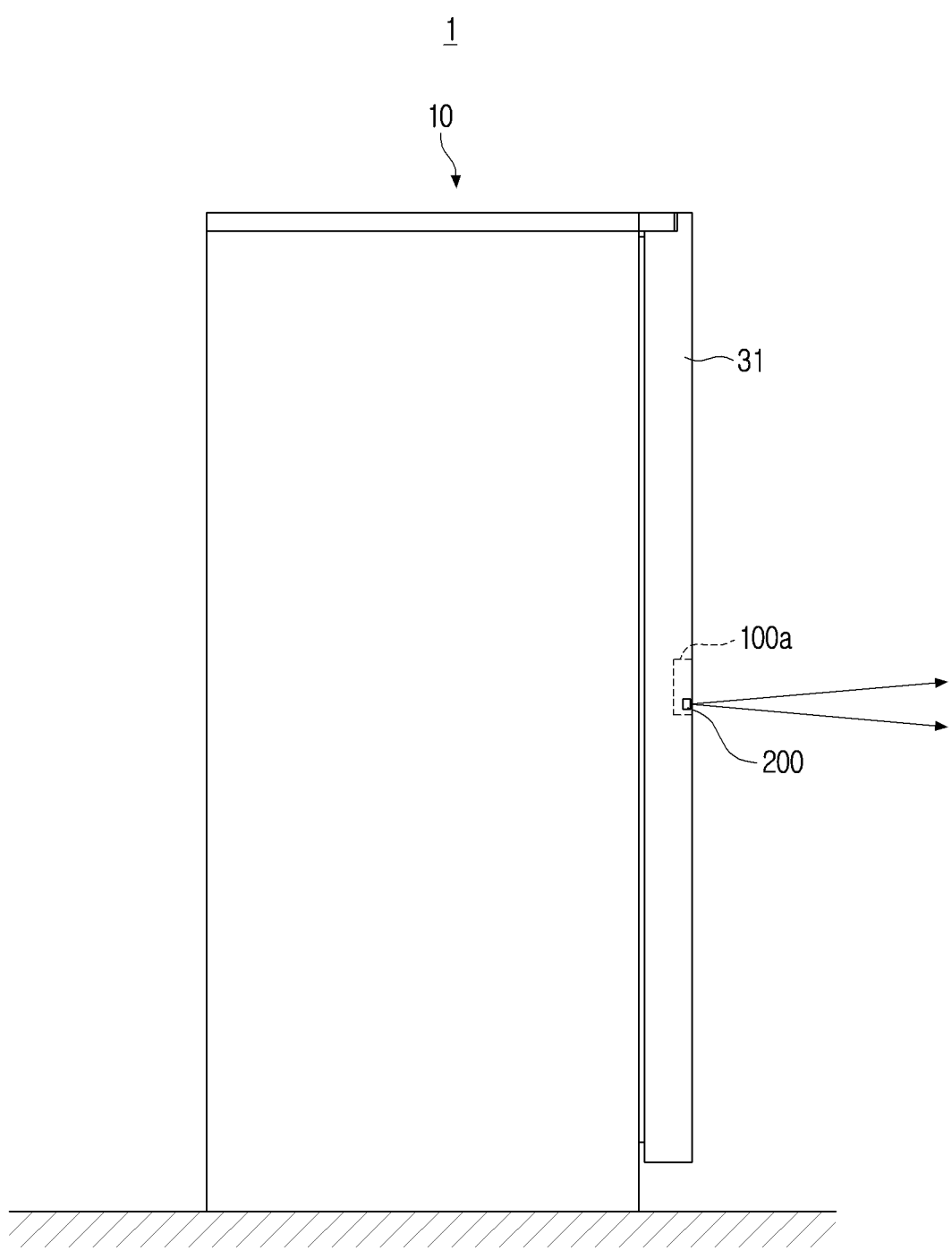
FIG. 13 is a side diagram illustrating an example of a distance sensor integrally disposed at a touch interface of a refrigerator according to one or more embodiments of the disclosure.

FIG. 11 is a block diagram illustrating a schematic configuration in which a distance sensor is added to a touch interface of a refrigerator according to one or more embodiments. FIG. 12 is a perspective diagram illustrating an example of a distance sensor added to a touch interface of a refrigerator according to one or more embodiments. FIG. 13 is a side diagram illustrating an example of a distance sensor integrally disposed at a touch interface of a refrigerator according to one or more embodiments.

Referring to FIG. 11, the refrigerator 1 according to one or more embodiments may include the door opening device 80, a touch interface 100a, the processor 191, and the memory 193. The touch interface 100a may include a distance sensor 200. The distance sensor 200 may be a distance sensor of a Time of Flight (ToF) method.

Referring to FIG. 12, the distance sensor 200 may be disposed at the inner side of the cover 110 and electrically connected to the printed circuit board 150. The distance sensor 200 may sense the user approaching within a pre-set distance range of the front direction from the front direction of the refrigerator 1.

The distance sensor 200 may generate a sensing signal according to sensing an approach by the user. The processor 191 may receive the sensing signal generated from the distance sensor 200. The processor 191 may identify, based on the sensing signal, whether the user is approaching. The processor 191 may turn-on the plurality of light sources 161, 162, 163, and 164 for light to be emitted from the indicator 136 of the touch interface 100a based on the sensing signal. The processor 191 may turn-off the plurality of light sources 161, 162, 163, and 164 if an approach by the user is not sensed by the distance sensor 200 for a certain time.

The distance sensor 200 may include a light emitting part that emits light and a light receiving part that receives light. The light emitting part may emit light in a predetermined field of view (FOV) through an opening 119 formed at the cover 110, and the light receiving part may receive light incident in the predetermined FOV through the opening 119 formed at the cover 110.

The FOV of the light emitting part may be within an angle (e.g., approximately 35 degrees) with a straight line, which is directed from a center of the light emitting part toward a measurement direction (right side direction in FIG. 13, hereinafter referred to as 'front side of distance sensor 200') of the distance sensor 200 with the center of the light emitting part as a vertex. Here, the straight line that is directed toward the measurement direction of the distance sensor 200 may be referred to as a normal for a front side surface of the distance sensor 200 that passes, for example, the center of the light emitting part. Here, 'normal' may be a normal for the front side surface of the distance sensor 200, that is, a straight line that is directed toward the measurement direction of the distance sensor 200.

The light irradiated toward the front side of the distance sensor 200 from the light emitting part may be reflected by an object (e.g., user) and incident to the light receiving part. The light receiving part may receive incident reflected light, and a distance to a target object may be calculated based on the received reflected light. A sensing area that the distance sensor 200 is able to sense the target object may be determined by a FOV of the light emitting part and a FOV of the light receiving part, and may be determined similarly with the FOV of the light receiving part according to the related art. For example, the sensing area of the distance sensor 200 may be approximately 25 degrees in range based on the normal that passes the center of the light receiving part. A maximum distance that the distance sensor 200 is able to sense may be pre-set such as 60 cm, 200 cm, 400 cm, and 800 cm.

The processor 191 may turn-on, based on the sensing signal of the distance sensor 200, the plurality of light sources 161, 162, 163, and 164 by determining that the user has approached within a pre-set distance. Accordingly, the light incident from the plurality of light sources 161, 162, 163, and 164 to the light guide member 130 may be emitted to the indicator 136 through the inside of the light guide member 130. The user may identify an accurate touch point through the indicator 136 through which light is emitted.

In this case, the processor 191 may control to maintain a certain brightness while having turned-on the plurality of light sources 161, 162, 163, and 164, but is not limited thereto. For example, the processor 191 may control turning-on or turning-off the plurality of light sources 161, 162, 163, and 164 repeatedly at a short time interval (e.g., 0.1 sec. to 0.5 sec.) to operate the plurality of light sources 161, 162, 163, and 164 to blink.

The refrigerator 1 according to one or more embodiments may include a microphone configured to receive a voice command of the user. The processor 191 may turn-on, based on the voice command (e.g., "touch position") of the user received in the microphone, the plurality of light sources 161, 162, 163, and 164. Accordingly, the user may identify the accurate touch point through the indicator 136 through which light is emitted.

As described above, the plurality of light sources 161, 162, 163, and 164 included in the touch interface 100a may be turned-off if the user does not approach the refrigerator 1, and the plurality of light sources 161, 162, 163, and 164 may be turned-on only if the user approaches the refrigerator and light may be emitted through the indicator 136.

The touch interface 100a may include a florescent marking member in a band form configured to surround the indicator along the surrounding of the insertion hole 111 of the cover 110. The florescent marking member may include, for example, a florescent layer formed of a florescent material, and a transparent layer that covers the florescent layer. The transparent layer may prevent the florescent layer from being damaged by external force. Accordingly, if the user is outside a predetermined distance range which is determinable by the distance sensor 200, the touch position may be identified through the florescent marking member even when the plurality of light sources 161, 162, 163, and 164 are in a turned-off state.

The distance sensor 200 has been described as being disposed in the touch interface 100a, but is not limited thereto. An example of the distance sensor 200 separated from the touch interface 100a will be described below with reference to the drawing.

Figure 14:
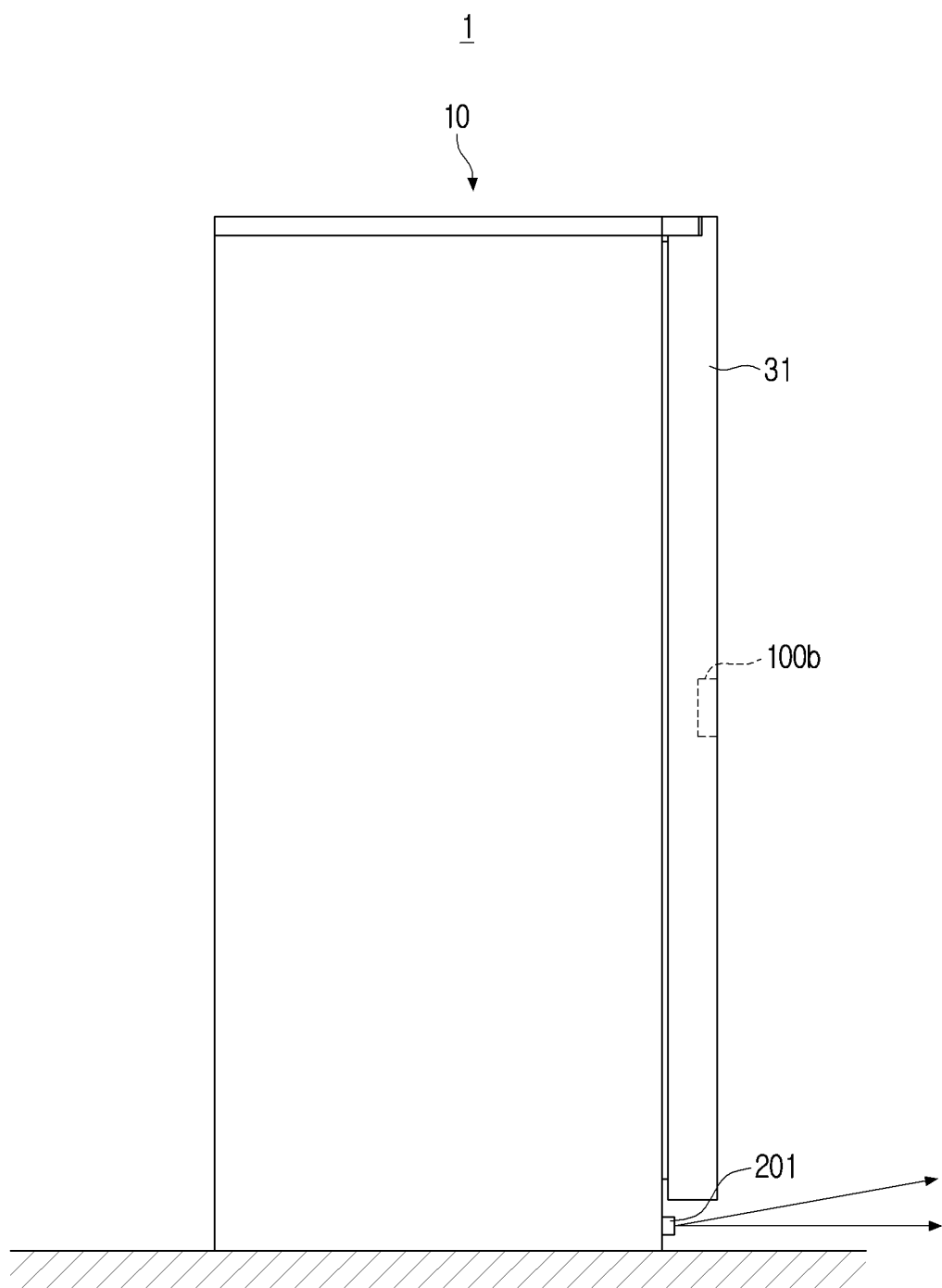
FIG. 14 is a side diagram illustrating an example of a distance sensor spaced apart from a touch interface of a refrigerator being separated and disposed according to one or more embodiments of the disclosure.

FIG. 14 is a side diagram illustrating an example of a distance sensor spaced apart from a touch interface of a refrigerator being separated and disposed according to one or more embodiments.

Referring to FIG. 14, a touch interface 100b may be disposed at a lower side of the first door 31. For example, a distance sensor 201 may be disposed at a front lower end of the main body 10 of the refrigerator 1 to be separated from the touch interface 100b and close to a floor. Accordingly, the distance sensor 201 may easily sense a foot or a lower body of a person approaching the refrigerator 1.

Because the distance sensors 200 and 201 and operations by the processor based therefrom have been described in detail in the part described above, redundant descriptions thereof will be omitted. In addition to the above, a speaker and the like may be further included. In this case, if an approach by the user is sensed by the distance sensors 200 and 201, the processor 191 may provide, through the speaker, a voice guide message with a content of the refrigerator door being opened if the user touches the indicator 136 of the touch interface 100, or the like. Based on the above, the user may be able to easily understand a position, a door opening method, or the like of the refrigerator 1.

In addition, when an approach by the user is sensed by the distance sensors 200 and 201, the processor 191 may control the plurality of light sources 161, 162, 163, and 164 such that the plurality of light sources 161, 162, 163, and 164 repeatedly flickers for the user to easily recognize the indicator 136 through the naked eye.

Figure 15:
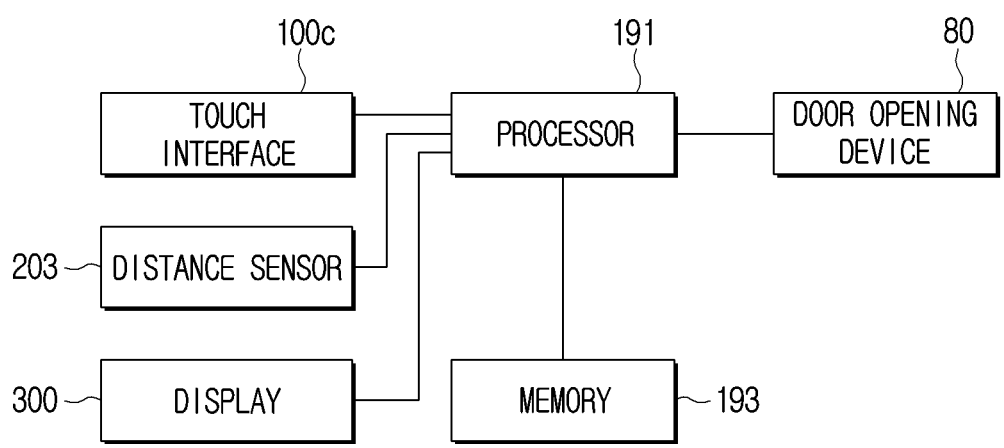
FIG. 15 is a block diagram illustrating a schematic configuration of a refrigerator according to one or more embodiments of the disclosure.

FIG. 15 is a block diagram illustrating a schematic configuration of a refrigerator according to one or more embodiments.

Referring to FIG. 15, the refrigerator according to one or more embodiments may include a touch interface 100c, a distance sensor 203 configured to sense the user, a display 300 configured to display information for guiding a position of the touch interface 100c, the door opening device 80, the processor 191, and the memory 193.

The distance sensor 203 may be provided at one place from among the main body 10, the door 30, and the touch interface 100c.

The display 300 may be provided at the door 30. For example, the display 300 may be provided at the front surface of the door 30. The display 300 has been described as being provided at the front surface of the door 30, but is not limited thereto. For example, the display 300 may be disposed at a portion of the side surface or the main body 10 of the door 30.

The display 300 may be a touch screen configured to display information and receive input of information through a touch of the user, but is not limited thereto. For example, the display 300 may easily change a design or color of an exterior of the refrigerator 1 by providing an electrophoretic display panel which is disposed at a whole front surface of the door. The electrophoretic display panel may maintain energy efficiency of the refrigerator 1 at a high level because it operates at low-power and does not need electricity when a still screen is kept running since electricity is used only when a content of a pixel is changed. In addition, the display 300 may be provided as a display panel of a different type which is not the electrophoretic display panel (e.g., a ClearInk, an electrowetting display (EWD), a memory LCD, an interferometric modulator display (IMOD), or a LCD panel).

The display 300 may be configured to display guide information notifying of a touch area (e.g., indicator 136 of the touch interface 100c). For example, the processor 191 may control, based on an approach of the user being sensed by the distance sensor 203, the display 300 to display text information such as "please touch the side surface of the door to open the door" in the display 300. In addition, the processor 191 may control the display 300 to display image information showing the part at which the touch interface 100c is positioned at the door of the refrigerator or moving image information showing the position of the touch interface together with the text information in the display 300.

The text information, the image information, and the moving image information may be stored in the memory 193.

In addition, the processor 191 may control, based on an approach of the user being sensed by the distance sensor 203, the display 300 to output light from a first edge area of the display 300 adjacent with the touch interface 100c. In this case, the processor 191 may control the display 300 so as to appear as if light is moving from a second edge area of the display 300 positioned farther than the first edge area of the display 300 from the touch interface 100c to the first edge area of the display 300.

The processor 191 may minimize power consumption by turning-off the display 300 if an approach of the user is not sensed by the distance sensor 203 for a certain time.

The refrigerator according to one or more embodiments may further include a speaker (not shown) for outputting voice. Accordingly, the processor 191 may output, when an approach of the user is sensed by the distance sensor 203, sound information notifying of a touch area through the speaker while displaying guide information (text information, image information, or moving image information) notifying of the touch area in the display 300.

Figure 16:
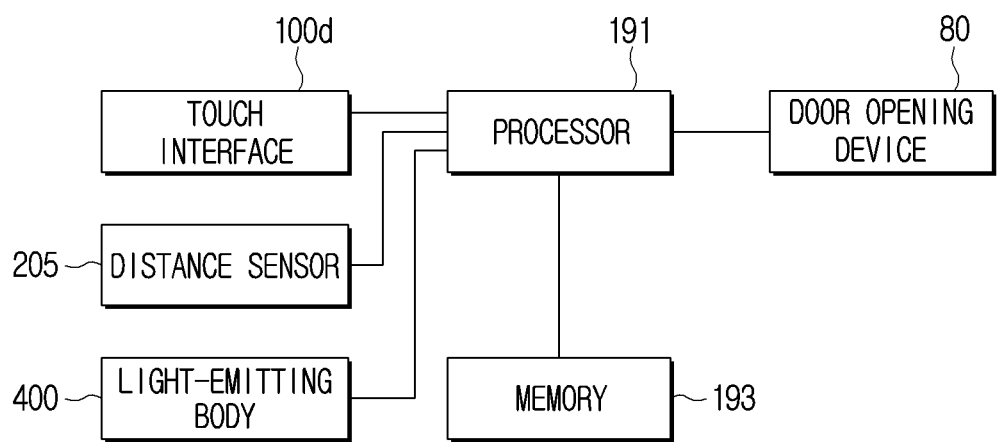
FIG. 16 is a block diagram illustrating a schematic configuration of a refrigerator according to one or more embodiments of the disclosure.

FIG. 16 is a block diagram illustrating a schematic configuration of a refrigerator according to one or more embodiments.

Referring to FIG. 16, the refrigerator according to one or more embodiments may include a touch interface 100d, a distance sensor 205 configured to sense the user, a light-emitting body 400 configured to display information for guiding a position of the touch interface 100d, the door opening device 80, the processor 191, and the memory 193.

The distance sensor 205 may be provided at one place from among the main body 10, the door 30, and the touch interface 100c.

The light-emitting body 400 may be provided at the door 30. In this case, the light-emitting body 400 may be provided at the front surface of the door 30 or the side surface of the door 30 at a surrounding of the touch interface 100d so as to notify of a touch area (e.g., indicator 136 of the touch interface 100d).

The light-emitting body 400 may be one from among a single light emitting diode, an LED bar with a plurality of light emitting diodes arranged in one line, a mini LED or a display module including the micro LED, or a small-scale LCD module. The light-emitting body 400 may have a predetermined shape. For example, the light-emitting body 400 may be one shape from among a linear shape (a straight line, a curved line, a multiple bent line), a straight line or a curved line in a zigzag form, a triangular shape, an arrow shape.

The processor 191 may control, based on an approach of the user being sensed by the distance sensor 205, the light-emitting body 400 so as to be turned-on. The processor 191 may minimize power consumption by turning-off the light-emitting body 400 if an approach of the user is not sensed by the distance sensor 205 for a certain time.

The refrigerator according to one or more embodiments may further include the speaker (not shown) for a voice output. Accordingly, the processor 191 may output, based on an approach of the user being sensed by the distance sensor 205, sound information notifying of the touch area through the speaker while turning-on the light-emitting body 400 to notify of the touch area.

While aspects of the refrigerator have been described based on specific shapes and directions with reference to the accompanied drawings above, it will be understood that various changes in form and details may be made therein by those of ordinary skill in the art, and the changes in form and details are to be understood as included in the true spirit and full scope of the disclosure.

What is claimed is:

1. A refrigerator, comprising:
   a main body configured with a storage compartment;
   a door configured to be rotatable to open and close the storage compartment;
   a touch interface on the door, and configured to sense a touch of a user; and
   a door opening device configured to rotate the door to open the storage compartment when the touch interface senses the touch of the user,
   wherein the touch interface includes an indicator configured to emit light out of the touch interface to assist a user to locate the touch interface,
   the touch interface includes a cover on a side surface of the door, and
   the indicator is exposed to an outer side of the cover.

2. The refrigerator of claim 1, wherein
   the indicator is disposed toward a same direction as is a front surface of the door.

3. The refrigerator of claim 1, wherein
   the indicator protrudes from one surface of the cover.

4. The refrigerator of claim 1, wherein
   the touch interface includes:
   at least one light source at an inner side of the cover,
   a light guide member configured to transfer incident light from the at least one light source to the indicator,
   a touch sensor configured to generate a touch signal by sensing the touch of the user, and
   a conductive member disposed between the indicator and the touch sensor.

5. The refrigerator of claim 4, wherein
   the indicator is integrally formed with the light guide member.

6. The refrigerator of claim 4, wherein
   the conductive member includes:
   a medium block adjacent to the indicator, and
   a transparent electrode on an outer surface of the medium block and electrically connected with the touch sensor, and
   a portion of the transparent electrode contacts a back surface of the indicator.

7. The refrigerator of claim 6, wherein
   the medium block is transparent or semi-transparent.

8. The refrigerator of claim 6, wherein
   the medium block includes one from among a porous foam, a silicon rubber, and a glass through which the incident light from the at least one light source reflected along an inside of the light guide member is passed.

9. The refrigerator of claim 4, wherein
   the light guide member includes:
   a first part adjacent to the at least one light source, and
   a second part extending longitudinally between the indicator and the first part, and in which the conductive member is inserted, and
   the indicator is integrally formed with the second part.

10. The refrigerator of claim 4, wherein
    the light guide member includes:
    a light leakage prevention film covering an outer surface of the light guide member.

11. The refrigerator of claim 1, further comprising:
    at least one processor configured to
    control the door opening device to rotate the door to open the storage compartment according to at least one instruction based on the sensing of the touch of the user.

12. The refrigerator of claim 11, further comprising:
a distance sensor configured to sense an approach of a user within a pre-set distance range from the main body,
wherein the at least one processor is configured to obtain a sensing signal from the distance sensor, and control at least one light source which provides light to the indicator to be turned on and off based on the obtained sensing signal.

13. The refrigerator of claim 12, wherein the distance sensor is in the touch interface.

14. The refrigerator of claim 12, wherein the distance sensor is on a front surface of the main body corresponding to a lower side of the door.

* * * * *